US009528035B2

(12) United States Patent
Campbell

(10) Patent No.: US 9,528,035 B2
(45) Date of Patent: Dec. 27, 2016

(54) CURABLE AND CURED ADHESIVE COMPOSITIONS

(75) Inventor: Christopher J. Campbell, Burnsville, MN (US)

(73) Assignee: 3M INNOVATIVE PROPERTIES COMPANY, Saint Paul, MN (US)

(*) Notice: Subject to any disclaimer, the term of this patent is extended or adjusted under 35 U.S.C. 154(b) by 607 days.

(21) Appl. No.: 13/389,947

(22) PCT Filed: Aug. 20, 2010

(86) PCT No.: PCT/US2010/046064
§ 371 (c)(1),
(2), (4) Date: Feb. 10, 2012

(87) PCT Pub. No.: WO2011/031429
PCT Pub. Date: Mar. 17, 2011

(65) Prior Publication Data
US 2012/0141803 A1 Jun. 7, 2012

Related U.S. Application Data

(60) Provisional application No. 61/241,425, filed on Sep. 11, 2009.

(51) Int. Cl.
| C09J 163/00 | (2006.01) |
| C09J 171/02 | (2006.01) |
| C08L 63/00 | (2006.01) |
| C08L 71/02 | (2006.01) |

(52) U.S. Cl.
CPC ............ *C09J 163/00* (2013.01); *C09J 171/02* (2013.01); *C08L 63/00* (2013.01); *C08L 71/02* (2013.01); *Y10T 428/31515* (2015.04)

(58) Field of Classification Search
CPC .............................. C08L 63/00; C09J 163/00
USPC ....................................................... 428/414
See application file for complete search history.

(56) References Cited

U.S. PATENT DOCUMENTS

| 3,409,497 A * | 11/1968 | Roseland | C08J 5/046 156/181 |
| 3,853,690 A * | 12/1974 | McGarry | B32B 15/08 156/330 |
| 4,778,851 A | 10/1988 | Henton | |
| 5,629,380 A | 5/1997 | Baldwin | |
| 6,015,865 A | 1/2000 | Blank | |
| 6,057,402 A | 5/2000 | Zhou | |
| 6,486,256 B1 | 11/2002 | Tarbutton | |
| 6,632,872 B1 | 10/2003 | Pellerite | |
| 6,645,341 B1 | 11/2003 | Gordon | |
| 6,776,869 B1 | 8/2004 | Schenkel | |
| 6,800,157 B2 | 10/2004 | Tarbutton | |
| 6,884,854 B2 | 4/2005 | Schoenfeld | |
| 7,019,075 B2 | 3/2006 | Righettini | |
| 7,511,097 B2 | 3/2009 | Frick | |
| 8,062,468 B2 | 11/2011 | Finter | |
| 2001/0053450 A1* | 12/2001 | Yeager et al. | 428/461 |
| 2002/0061941 A1 | 5/2002 | Masamune | |
| 2004/0052951 A1* | 3/2004 | Sauer et al. | 427/385.5 |
| 2004/0181013 A1 | 9/2004 | Schenkel | |
| 2006/0276601 A1 | 12/2006 | Lutz | |
| 2007/0105983 A1 | 5/2007 | Kramer | |
| 2008/0145601 A1* | 6/2008 | Levit et al. | 428/116 |
| 2008/0251202 A1 | 10/2008 | Eagle | |
| 2008/0251203 A1 | 10/2008 | Lutz | |
| 2008/0308212 A1 | 12/2008 | Sheasley | |
| 2009/0065143 A1 | 3/2009 | Frick | |
| 2009/0099312 A1 | 4/2009 | Weber | |
| 2009/0110835 A1 | 4/2009 | Pressley | |
| 2011/0024039 A1 | 2/2011 | Campbell | |
| 2011/0039108 A1 | 2/2011 | Goeb | |
| 2011/0120646 A1 | 5/2011 | Gorodisher | |
| 2011/0126980 A1 | 6/2011 | Campbell | |
| 2011/0130518 A1 | 6/2011 | Gorodisher | |
| 2012/0156501 A1 | 6/2012 | Campbell | |

FOREIGN PATENT DOCUMENTS

| CA | 1334700 | 3/1995 |
| EP | 0517167 | 12/1992 |
| EP | 0847420 | 6/1998 |
| EP | 1695990 | 8/2006 |
| JP | 03-294329 | 12/1991 |
| JP | 05156225 | 6/1993 |
| JP | 06-279745 | 10/1994 |
| JP | 2002-047467 | 2/2002 |
| WO | WO 03/078163 | 9/2003 |
| WO | WO 2006/128722 | 12/2006 |
| WO | WO 2007/025007 | 3/2007 |
| WO | WO 2008/016889 | 2/2008 |
| WO | WO 2008/089410 | 7/2008 |

(Continued)

OTHER PUBLICATIONS

BASF, 1997.*
Hexion, Feb. 2008.*
Huayuan, retrieved Apr. 21, 2014.*
Clemens, "Diketene", Chemical Reviews, Apr. 1986, vol. 86, No. 2, pp. 241-318.
Hansen, "Surface Tension by Pendant Drop", Journal of Colloid and Interface Science, Jan. 1, 1991, vol. 141, No. 1, pp. 1-9.
Pocius, *Adhesion and Adhesives Technology: An Introduction*, 2nd Edition, Hanser Gardner Publications, Inc., Cincinnati, Chapter 8, "The Chemistry and Physical Properties of Structural Adhesives", pp. 201-237, (2002).

(Continued)

*Primary Examiner* — Megan McCulley
(74) *Attorney, Agent, or Firm* — Jean A. Lown

(57) ABSTRACT

Curable adhesive compositions, cured adhesive compositions, and articles that include the cured adhesive compositions are described. The curable adhesive composition contains a) an epoxy resin, b) a curing agent, c) a reactive liquid modifier, d) a toughening agent, and e) an oil displacing agent. The cured adhesive compositions can be used as structural adhesives.

6 Claims, No Drawings

(56) References Cited

FOREIGN PATENT DOCUMENTS

WO  WO 2008/157571  12/2008
WO  WO 2009/017690  2/2009

OTHER PUBLICATIONS

Van Krevelen, *Properties of Polymers: Their Correlation with Chemical Structure; Their Numerical Estimation and Prediction from Additive Group Contributions*, Third Edition, Elsevier, New York, pp. 200-225 (1990).
Witzeman, "Transacetoacetylation with *tert*-Butyl Acetoacetate: Synthetic Applications", Journal of Organic Chemistry, Mar. 1991, vol. 56, No. 5, pp. 1713-1718.
International Search Report for PCT/US2010/046064, 4 pages.
"Sigma-Aldrich Catalog online, Poly(propylene glycol)", Jan. 1, 2010 (Jan. 1, 2010), XP002610041, Retrieved from the Internet: URL:http://www.sigmaaldrich.com/catalog/ProductDetail.do?lang=en&N4=202320^ALDRICH&N5=SEARCH_CONCAT_PNO^BRAND_KEY&F=SPEC [retrieved on Nov. 10, 2010].

\* cited by examiner

CURABLE AND CURED ADHESIVE COMPOSITIONS

CROSS REFERENCE TO RELATED APPLICATIONS

This application is a national stage filing under 35 U.S.C. 371 of PCT/US2010/046064, filed Aug. 20, 2010, which claims priority to U.S. Provisional Application No. 61/241,425, filed Sep. 11, 2009, the disclosure of which is incorporated by reference in its/their entirety herein.

TECHNICAL FIELD

Curable adhesive compositions, cured adhesive compositions, and articles that include the cured adhesive compositions are described.

BACKGROUND

Structural adhesives are typically thermosetting compositions that can be used to replace or augment conventional joining techniques such as screws, bolts, nails, staples, rivets, and metal fusion processes such as welding, brazing, and soldering. Structural adhesives are used in a variety of applications such as within the automotive and aerospace industries. To be useful as a structural adhesive, good mechanical strength and impact resistance are desired.

The physical properties of structural adhesive bonds depend on the interaction of the structural adhesive with the surface of the substrates to which the structural adhesive is applied. Under ideal conditions, the structural adhesive is applied to a clean surface; however, the surfaces of some substrates are contaminated with a hydrocarbon-containing material such as various oils and lubricants. Oil contamination is not uncommon on substrates that are part of a vehicle such as an automobile. The presence of the oil contamination can lead to undesirable bond failure at the adhesive/substrate interface.

Removing hydrocarbon-containing materials from the surfaces of substrates can be difficult. Mechanical processes such as dry wiping and/or using pressurized air tend to leave a thin layer of the hydrocarbon-containing material on the surfaces. Liquid cleaning compositions can be effective but these compositions typically need to be collected and recycled or discarded. Additionally, a drying step is typically needed after the cleaning step.

SUMMARY

Curable adhesive compositions, cured adhesive compositions, and articles that include the cured adhesive compositions are described. The cured adhesive compositions can be used in various applications such as those in which the curable adhesive compositions are applied to either a clean surface or to a surface contaminated with a hydrocarbon-containing material. The cured adhesive compositions can be used as a structural adhesive.

In a first aspect, a curable adhesive composition is provided that includes a first part and a second part. The curable adhesive composition contains a) an epoxy resin, b) a curing agent, c) a reactive liquid modifier, d) a toughening agent, and e) an oil displacing agent. The epoxy resin and the reactive liquid modifier are in the first part of the curable adhesive composition and the curing agent is in the second part of the curable adhesive composition. The toughening agent and the oil displacing agent can each independently be in the first part, in the second part, or in both the first part and the second part of the curable adhesive composition. The curing agent has at least two groups of formula —$NR^1H$ where $R^1$ is selected from hydrogen, alkyl, aryl, or alkylaryl. The reactive liquid modifier is a compound of Formula (I).

$$R^2(CO)CH_2(CO)O—R^3—O(CO)CH_2(CO)R^2 \quad (I)$$

Each group $R^2$ in Formula (I) independently is hydrogen or an alkyl. Group $R^3$ in Formula (I) has greater than 20 carbon atoms and is of formula —$[(CH_2)_nO]_m$—$(CH_2)_n$—. The variable n is an integer in the range of 2 to 4 and the variable m is an integer greater than or equal to 5. The oil displacing agent is soluble in the curable adhesive composition, has a surface tension in a range of 15 to 32 dynes/cm, and is not selected from a glycidyl ether.

In a second aspect, a cured adhesive composition is provided that includes the reaction product of a curable adhesive composition. The curable adhesive composition contains a) an epoxy resin, b) a curing agent, c) a reactive liquid modifier, d) a toughening agent, and e) an oil displacing agent. The curing agent has at least two groups of formula —$NR^1H$ where $R^1$ is selected from hydrogen, alkyl, aryl, or alkylaryl. The reactive liquid modifier is a compound of Formula (I).

$$R^2(CO)CH_2(CO)O—R^3—O(CO)CH_2(CO)R^2 \quad (I)$$

Each group $R^2$ in Formula (I) independently is hydrogen or an alkyl. Group $R^3$ in Formula (I) has greater than 20 carbon atoms and is of formula —$[(CH_2)_nO]_m$—$(CH_2)_n$—. The variable n is an integer in the range of 2 to 4 and the variable m is an integer greater than or equal to 5. The oil displacing agent is soluble in the curable adhesive composition, has a surface tension in a range of 15 to 32 dynes/cm, and is not selected from a glycidyl ether.

In a third aspect, an article is provided that includes a first surface, a second surface, and a cured adhesive composition positioned between the first surface and the second surface. The cured adhesive composition includes the reaction product of a curable adhesive composition. The curable adhesive composition contains a) an epoxy resin, b) a curing agent, c) a reactive liquid modifier, d) a toughening agent, and e) an oil displacing agent. The curing agent has at least two groups of formula —$NR^1H$ where $R^1$ is selected from hydrogen, alkyl, aryl, or alkylaryl. The reactive liquid modifier is a compound of Formula (I).

$$R^2(CO)CH_2(CO)O—R^3—O(CO)CH_2(CO)R^2 \quad (I)$$

Each group $R^2$ in Formula (I) independently is hydrogen or an alkyl. Group $R^3$ in Formula (I) has greater than 20 carbon atoms and is of formula —$[(CH_2)_nO]_m$—$(CH_2)_n$—. The variable n is an integer in the range of 2 to 4 and the variable m is an integer greater than or equal to 5. The oil displacing agent is soluble in the curable adhesive composition, has a surface tension in a range of 15 to 32 dynes/cm, and is not selected from a glycidyl ether.

The above summary of the present invention is not intended to describe each embodiment or every implementation of the present invention. The Detailed Description and Examples that follow more particularly exemplify these embodiments.

DETAILED DESCRIPTION OF THE INVENTION

Curable adhesive compositions and cured adhesives compositions that are the reaction products of the curable adhesive compositions are described. More specifically, the curable adhesive compositions contain a) an epoxy resin, b) a curing agent, c) a reactive liquid modifier, d) a toughening agent, and e) an oil displacing liquid. The cured adhesive compositions can be used, for example, as structural adhesives to bond together two surfaces. These surfaces can be clean or can be at least partially contaminated with a hydrocarbon-containing material such as one or more oils or lubricants. The structural adhesives can be used, for example, to replace or augment conventional joining means such as welds or mechanical fasteners in bonding various surfaces together.

The curable adhesive compositions are often in the form of a two-part composition. The epoxy resin is typically separated from the curing agent prior to use of the curable adhesive composition. That is, the epoxy resin is typically in a first part and the curing agent is typically in a second part of the curable adhesive composition. The first part can include other components that do not react with the epoxy resin or that react with only a portion of the epoxy resin. Likewise, the second part can include other components that do not react with the curing agent or that react with only a portion of the curing agent. The reactive liquid modifier is typically added to the first part to avoid premature reaction with the curing agent. The toughening agent and displacing liquid can be included in the first part, in the second part, or in both the first part and the second part. When the first part and the second part are mixed together, the various components react to form the cured adhesive composition.

The epoxy resin that is included in the first part contains at least one epoxy functional group (i.e., oxirane group) per molecule. As used herein, the term oxirane group refers to the following divalent group.

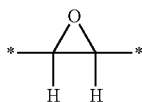

The asterisks denote a site of attachment of the oxirane group to another group. If the oxirane group is at the terminal position of the epoxy resin, the oxirane group is typically bonded to a hydrogen atom.

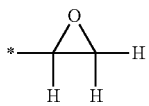

This terminal oxirane group is often part of a glycidyl group.

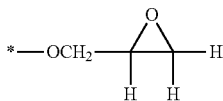

The epoxy resin often has at least one oxirane group per molecule and often has at least two oxirane groups per molecule. For example, the epoxy resin can have 1 to 10, 2 to 10, 1 to 6, 2 to 6, 1 to 4, or 2 to 4 oxirane groups per molecule. The oxirane groups are usually part of a glycidyl group.

Epoxy resins can be a single material or a mixture of materials selected to provide the desired viscosity characteristics before curing and to provide the desired mechanical properties after curing. If the epoxy resin is a mixture of materials, at least one of the epoxy resins in the mixture is typically selected to have at least two oxirane groups per molecule. For example, a first epoxy resin in the mixture can have two to four oxirane groups and a second epoxy resin in the mixture can have one to four oxirane groups. In some of these examples, the first epoxy resin is a first glycidyl ether with two to four glycidyl groups and the second epoxy resin is a second glycidyl ether with one to four glycidyl groups.

The portion of the epoxy resin molecule that is not an oxirane group (i.e., the epoxy resin molecule minus the oxirane groups) can be aromatic, aliphatic or a combination thereof and can be linear, branched, cyclic, or a combination thereof. The aromatic and aliphatic portions of the epoxy resin can include heteroatoms or other groups that are not reactive with the oxirane groups. That is, the epoxy resin can include halo groups, oxy groups such as in an ether linkage group, thio groups such as in a thio ether linkage group, carbonyl groups, carbonyloxy groups, carbonylimino groups, phosphono groups, sulfono groups, nitro groups, nitrile groups, and the like. The epoxy resin can also be a silicone-based material such as a polydiorganosiloxane-based material.

Although the epoxy resin can have any suitable molecular weight, the weight average molecular is usually at least 100 grams/mole, at least 150 grams/mole, at least 175 grams/mole, at least 200 grams/mole, at least 250 grams/mole, or at least 300 grams/mole. The weight average molecular weight can be up to 50,000 gram/mole or even higher for polymeric epoxy resins. The weight average molecular weight is often up to 40,000 grams/mole, up to 20,000 grams/mole, up to 10,000 grams/mole, up to 5,000 grams/mole, up to 3,000 grams/mole, or up to 1,000 grams/mole. For example, the weight average molecular weight can be in the range of 100 to 50,000 grams/mole, in the range of 100 to 20,000 grams/mole, in the range of 10 to 10,000 grams/mole, in the range of 100 to 5,000 grams/mole, in the range of 200 to 5,000 grams/mole, in the range of 100 to 2,000 grams/mole, in the range of 200 to 2,000 gram/mole, in the range of 100 to 1,000 grams/mole, or in the range of 200 to 1,000 grams/mole.

Suitable epoxy resins are typically a liquid at room temperature (e.g., about 20° C. to about 25° C.). However, epoxy resins that can be dissolved in a suitable solvent also can be used. In most embodiments, the epoxy resin is a glycidyl ether. Exemplary glycidyl ethers can be of Formula (II).

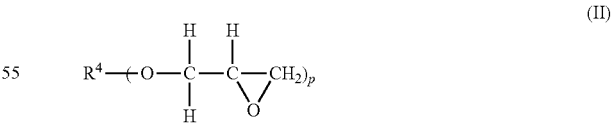

In Formula (II), group $R^4$ is a p-valent group that is aromatic, aliphatic, or a combination thereof. Group $R^4$ can be linear, branched, cyclic, or a combination thereof. Group $R^4$ can optionally include halo groups, oxy groups, thio groups, carbonyl groups, carbonyloxy groups, carbonylimino groups, phosphono groups, sulfono groups, nitro groups, nitrile groups, and the like. Although the variable p can be any suitable integer greater than or equal to 1, p is often an integer in the range of 2 to 4.

In some exemplary epoxy resins of Formula (II), the variable p is equal to 2 (i.e., the epoxy resin is a diglycidyl ether) and $R^4$ includes an alkylene (i.e., an alkylene is a divalent radical of an alkane and can be referred to as an alkane-diyl), heteroalkylene (i.e., a heteroalkylene is a divalent radical of a heteroalkane and can be referred to as a heteroalkane-diyl), arylene (i.e., a divalent radical of a arene compound), or mixture thereof. Suitable alkylene groups often have 1 to 20 carbon atoms, 1 to 12 carbon atoms, 1 to 8 carbon atoms, or 1 to 4 carbon atoms. Suitable heteroalkylene groups often have 2 to 50 carbon atoms, 2 to 40 carbon atoms, 2 to 30 carbon atoms, 2 to 20 carbon atoms, 2 to 10 carbon atoms, or 2 to 6 carbon atoms. The heteroatoms in the heteroalkylene can be selected from oxy, thio, or —NH— groups but are often oxy groups. Suitable arylene groups often have 6 to 18 carbon atoms or 6 to 12 carbon atoms. For example, the arylene can be phenylene. Group $R^4$ can further optionally include halo groups, oxy groups, thio groups, carbonyl groups, carbonyloxy groups, carbonylimino groups, phosphono groups, sulfono groups, nitro groups, nitrile groups, and the like. The variable p is usually an integer in the range of 2 to 4.

Some epoxy resins of Formula (II) are diglycidyl ethers where $R^4$ includes (a) an arylene group or (b) an arylene group in combination with an alkylene, heteroalkylene, or both. Group $R^4$ can further include optional groups such as halo groups, oxy groups, thio groups, carbonyl groups, carbonyloxy groups, carbonylimino groups, phosphono groups, sulfono groups, nitro groups, nitrile groups, and the like. These epoxy resins can be prepared, for example, by reacting an aromatic compound having at least two hydroxyl groups with an excess of epichlorohydrin. Examples of useful aromatic compounds having at least two hydroxyl groups include, but are not limited to, resorcinol, catechol, hydroquinone, p,p'-dihydroxydibenzyl, p,p'-dihydroxyphenylsulfone, p,p'-dihydroxybenzophenone, 2,2'-dihydroxyphenyl sulfone, and p,p'-dihydroxybenzophenone. Still other examples include the 2,2',2,3',2,4',3,3',3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylenphenylmethane, dihydroxydiphenylbutylphenylmethane, dihydroxydiphenyltolylethane, dihydroxydiphenyltolylmethylmethane, dihydroxydiphenyldicyclohexylmethane, and dihydroxydiphenylcyclohexane.

Some commercially available diglycidyl ether epoxy resins of Formula (II) are derived from bisphenol A (i.e., bisphenol A is 4,4'-dihydroxydiphenylmethane). Examples include, but are not limited to, those available under the trade designation EPON (e.g., EPON 828, EPON 872, and EPON 1001) from Hexion Specialty Chemicals, Inc. in Houston, Tex., those available under the trade designation DER (e.g., DER 331, DER 332, and DER 336) from Dow Chemical Co. in Midland, Mich., and those available under the trade designation EPICLON (e.g., EPICLON 850) from Dainippon Ink and Chemicals, Inc. in Chiba, Japan. Other commercially available diglycidyl ether epoxy resins are derived from bisphenol F (i.e., bisphenol F is 2,2'-dihydroxydiphenylmethane). Examples include, but are not limited to, those available under the trade designation DER (e.g., DER 334) from Dow Chemical Co. and those available under the trade designation EPICLON (e.g., EPICLON 830) from Dainippon Ink and Chemicals, Inc.

Other epoxy resins of Formula (II) are diglycidyl ethers of a poly(alkylene oxide) diol. These epoxy resins can be referred to as diglycidyl ethers of a poly(alkylene glycol) diol. The variable p is equal to 2 and $R^4$ is a heteroalkylene having oxygen heteroatoms. The poly(alkylene glycol) can be copolymer or homopolymer. Examples include, but are not limited to, diglycidyl esters of poly(ethylene oxide) diol, diglycidyl esters of polypropylene oxide) diol, and diglycidyl esters of poly(tetramethylene oxide) diol. Epoxy resins of this type are commercially available from Polysciences, Inc. in Warrington, Pa. such as those derived from a poly (ethylene oxide) diol or from a poly(propylene oxide) diol having a weight average molecular weight of about 400 grams/mole, about 600 grams/mole, or about 1000 gram/mole.

Still other epoxy resins of Formula (II) are diglycidyl ethers of an alkane diol ($R^4$ is an alkylene and the variable p is equal to 2). Examples include a diglycidyl ether of 1,4-dimethanol cylcohexyl, diglycidyl ether of 1,4-butanediol, and diglycidyl ethers of the cycloaliphatic diol formed from a hydrogenated bisphenol A such as those commercially available under the trade designation EPONEX 1510 from Hexion Specialty Chemicals, Inc. of Columbus, Ohio.

Yet other epoxy resins include silicone resins with at least two glycidyl groups and flame retardant epoxy resins with at least two glycidyl groups (e.g., a brominated bisphenol-type epoxy resin having with at least two glycidyl groups such as that commercially available from Dow Chemical Co. in Midland, Mich. under the trade designation DER 580).

The epoxy resin is often a mixture of materials. For example, the epoxy resins can be selected to be a mixture that provides the desired viscosity or flow characteristics prior to curing. The mixture can include at least one first epoxy resin that is referred to as a reactive diluent that has a lower viscosity and at least one second epoxy resin that has a higher viscosity. The reactive diluent tends to lower the viscosity of the epoxy resin mixture and often has either a branched backbone that is saturated or a cyclic backbone that is saturated or unsaturated. Examples include, but are not limited to, the diglycidyl ether of resorcinol, the diglycidyl ether of cyclohexane dimethanol, the diglycidyl ether of neopentyl glycol, and the triglycidyl ether of trimethylolpropane. Diglycidyl ethers of cyclohexane dimethanol are commercially available under the trade designation HELOXY MODIFIER 107 from Hexion Specialty Chemicals in Columbus, Ohio and under the trade designation EPODIL 757 from Air Products and Chemical Inc. in Allentown, Pa. Other reactive diluents have only one functional group (i.e., oxirane group) such as various monoglycidyl ethers. Some exemplary monoglycidyl ethers include, but are not limited to, alkyl glycidyl ethers with an alkyl group having 1 to 20 carbon atoms, 1 to 12 carbon atoms, 1 to 8 carbon atoms, or 1 to 4 carbon atoms. Some exemplary monoglycidyl ethers are commercially available under the trade designation EPODIL from Air Products and Chemical, Inc. in Allentown, Pa. such as EPODIL 746 (2-ethylhexyl glycidyl ether), EPODIL 747 (aliphatic glycidyl ether), and EPODIL 748 (aliphatic glycidyl ether).

In most embodiments, the epoxy resin includes one or more glycidyl ethers and does not include epoxy alkanes and epoxy esters. Epoxy alkanes and epoxy esters can be included in the curable adhesive compositions, however, as oil displacing agents.

The curable adhesive composition typically includes at least 20 weight percent epoxy resin based on a combined weight of the first part and the second part (i.e., based on a total weight of the curable adhesive composition). For example, the curable adhesive composition can include at least 25 weight percent, at least 30 weight percent, at least 40 weight percent, or at least 50 weight percent epoxy resin.

The curable adhesive composition often includes up to 90 weight percent epoxy resin. For example, the curable composition can include up 80 weight percent, up to 75 weight percent, up to 70 weight percent, up to 65 weight percent, or up to 60 weight percent epoxy resin. Some exemplary curable adhesive compositions contain 20 to 90 weight percent, 20 to 80 weight percent, 20 to 70 weight percent, 30 to 90 weight percent, 30 to 80 weight percent, 30 to 70 weight percent, 30 to 60 weight percent, 40 to 90 weight percent, 40 to 80 weight percent, 40 to 70 weight percent, 50 to 90 weight percent, 50 to 80 weight percent, or 50 to 70 weight percent epoxy resin.

The epoxy resin is cured by reacting with a curing agent that is typically in a second part of the curable adhesive composition. The epoxy resin is typically separated from the curing agent during storage or prior to using the curable adhesive composition. The curing agent has at least two primary amino groups, at least two secondary amino groups, or combinations thereof. That is, the curing agent has at least two groups of formula —NR$^1$H where R$^1$ is selected from hydrogen, alkyl, aryl, or alkylaryl. Suitable alkyl groups often have 1 to 12 carbon atoms, 1 to 8 carbon atoms, 1 to 6 carbon atoms, or 1 to 4 carbon atoms. The alkyl group can be cyclic, branched, linear, or a combination thereof. Suitable aryl groups usually have 6 to 12 carbon atom such as a phenyl group. Suitable alkylaryl groups can be either an alkyl substituted with an aryl or an aryl substituted with an alkyl. The same aryl and alkyl groups discussed above can be used in the alkylaryl groups.

When the first part and the second part of the curable adhesive composition are mixed together, the primary and/or secondary amino groups of the curing agent react with the oxirane groups of the epoxy resin. This reaction opens the oxirane groups and covalently bonds the curing agent to the epoxy resin. The reaction results in the formation of divalent groups of formula —OCH$_2$—CH$_2$—NR$^1$—.

The curing agent minus the at least two amino groups (i.e., the portion of the curing agent that is not an amino group) can be any suitable aromatic group, aliphatic group, or combination thereof. Some amine curing agents are of Formula (III) with the additional limitation that there are at least two primary amino groups (i.e., —NH$_2$ groups), at least two secondary amino groups (i.e., —NHR$^1$ groups where R$^1$ is equal to an alkyl, aryl, or alkylaryl), or at least one primary amino group and at least one secondary amino group.

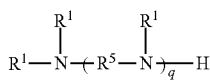

(III)

Each R$^5$ is independently an alkylene, heteroalkylene, or combination thereof. Suitable alkylene groups often have 1 to 18 carbon atoms, 1 to 12 carbon atoms, 1 to 8 carbon atoms, 1 to 6 carbon atoms, or 1 to 4 carbon atoms. Suitable heteroalkylene groups have at least one oxy, thio, or —NH— group positioned between two alkylene groups. Suitable heteroalkylene groups often have 2 to 50 carbon atoms, 2 to 40 carbon atoms, 2 to 30 carbon atoms to 20 carbon atoms, or 2 to 10 carbon atoms with up to 20 heteroatoms, up to 16 heteroatoms, up to 12 heteroatoms, or up to 10 heteroatoms. The heteroatoms are often oxy groups. The variable q is an integer equal to at least one and can be up to 10 or higher, up to 5, up to 4, or up to 3. Each R$^1$ group is independently hydrogen, alkyl, aryl, or alkylaryl. Suitable alkyl groups for R$^1$ often have 1 to 12 carbon atoms, 1 to 8 carbon atoms, 1 to 6 carbon atoms, or 1 to 4 carbon atoms. The alkyl group can be cyclic, branched, linear, or a combination thereof. Suitable aryl groups for R$^1$ often have 6 to 12 carbon atoms such as a phenyl group. Suitable alkylaryl groups for R$^1$ can be either an alkyl substituted with an aryl or an aryl substituted with an alkyl. The same aryl and alkyl groups discussed above can be used in the alkylaryl groups.

Some amine curing agents can have an R$^5$ group selected from an alkylene group. Examples include, but are not limited to, ethylene diamine, diethylene diamine, diethylene triamine, triethylene tetramine, propylene diamine, tetraethylene pentamine, hexaethylene heptamine, hexamethylene diamine, 2-methyl-1,5-pentamethylene diamine, 1-amino-3-aminomethyl-3,3,5-trimethylcyclohexane (also called isophorene diamine), and the like. Other amine curing agents can have an R$^5$ group selected from a heteroalkylene group such as a heteroalkylene having oxygen heteroatoms. For example, the curing agent can be a compound such as aminoethylpiperazine, 4,7,10-trioxamidecane-1,13-diamine (TTD) available from TCI America in Portland, Oreg., or a poly(alkylene oxide) diamine (also called polyether diamines) such as a poly(ethylene oxide) diamine, polypropylene oxide) diamine, or a copolymer thereof. Commercially available polyether diamines are commercially available under the trade designation JEFFAMINE form Huntsman Corporation in The Woodlands, Tex.

Still other amine curing agents can be formed by reacting a polyamine (i.e., a polyamine refers to an amine with at least two amino groups selected from primary amino groups and secondary amino groups) with another reactant to form an amine-containing adduct having at least two amino groups. For example, a polyamine can be reacted with an epoxy resin to form an adduct having at least two amino groups. If a polymeric diamine is reacted with a dicarboxylic acid in a molar ratio of diamine to dicarboxylic acid that is greater than or equal to 2:1, a polyamidoamine having two amino groups can be formed. In another example, if a polymeric diamine is reacted with an epoxy resin having two glycidyl groups in a molar ratio of diamine to epoxy resin greater than or equal to 2:1, an amine-containing adduct having two amino groups can be formed. A molar excess of the polymeric diamine is often used so that the curing agent includes both the amine-containing adduct plus free (non-reacted) polymeric diamine. For example, the molar ratio of diamine to epoxy resin with two glycidyl groups can be greater than 2.5:1, greater than 3:1, greater than 3.5:1, or greater than 4:1. Even when epoxy resin is used to form the amine-containing adduct in the second part of the curable adhesive composition, additional epoxy resin is present in the first part of the curable adhesive composition.

The curing agent can be a mixture of materials. For example, the curing agent can include a first curing agent that is a polymeric material added to enhance flexibility of the cured adhesive composition plus a second curing agent that is added to alter the glass transition temperature of the cured adhesive composition.

The curable adhesive compositions usually contain at least 3 weight percent curing agent based on a total weight of the curable adhesive composition. For example, the total curable adhesive composition can contain at least 3 weight percent, at least 5 weight percent, or at least 10 weight percent of the curing agent. The adhesive composition typically includes up to 30 weight percent, up to 25 weight percent, up to 20 weight percent, or up to 15 weight percent of the curing agent. For example, the curable adhesive composition can contain 3 to 30 weight percent, 3 to 25 weight percent, 3 to 20 weight percent, 3 to 15 weight percent, 3 to 10 weight percent, 5 to 30 weight percent, 5 to 25 weight percent, 5 to 20 weight percent, or 5 to 15 weight percent of the curing agent.

Other curing agents can be included in the curable adhesive composition. These other curing agents are typically considered to be secondary curatives because, compared to curing agents having at least two groups of formula —NHR$^1$, they are not as reactive with the oxarine rings of the epoxy resins at room temperature. Secondary curatives are often imidizoles or salts thereof, imidazolines or salts thereof, or phenols substituted with tertiary amino groups. Suitable phenols substituted with tertiary amino groups can be of

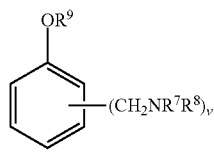

(IV)

In Formula (IV), each group R$^7$ and R$^8$ is independently an alkyl. The variable v is an integer equal to 2 or 3. Group R$^9$ is hydrogen or alkyl. Suitable alkyl groups for R$^7$, R$^8$, and R$^9$ often have 1 to 12 carbon atoms, 1 to 8 carbon atoms, 1 to 6 carbon atoms, or 1 to 4 carbon atoms. One exemplary secondary curative of Formula (IV) is tris-2,4,6-(dimethylaminomethyl)phenol that is commercially available under the trade designation ANCAMINE K54 from Air Products Chemicals, Inc. of Allentown, Pa.

The optional secondary curative can be present in the first part of the curable adhesive composition with the epoxy resin and the reactive liquid modifier or in the second part of the curable adhesive composition with the curing agent. The amount of the secondary curative is typically up to 6 weight percent, up to 5 weight percent, or up to 4 weight percent base on a total weight of the curable adhesive composition. If included in the first part, the secondary curative can be present in an amount in the range of 0 to 15 weight percent, in the range of 0.5 to 10 weight percent, or in the range of 1 to 5 weight percent based on a total weight of the first part. If included in the second part (curing agent side), the secondary curative can be present in an amount in the range of 0 to 5 weight percent, in the range of 0.5 to 5 weight percent, or in the range of 1 to 5 percent based on a total weight of the second part.

The curable adhesive composition further includes a reactive liquid modifier that is added to enhance the flexibility of the cured adhesive composition, to enhance the impact resistance, to enhance the effect of the toughening agent, or a combination thereof. The reactive liquid modifier is of Formula (I).

(I)

Group R$^2$ in Formula (I) is hydrogen or an alkyl. Group R$^3$ is of formula —[(CH$_2$)$_n$—O]$_m$—(CH$_2$)$_n$—. The variable n is an integer equal to 2, 3, or 4 and the variable m is an integer greater than or equal to 5. The R$^3$ group has greater than 20 carbon atoms. In many embodiments, the R$^3$ group has at least 25 carbon atoms, at least 30 carbon atoms, at least 40 carbon atoms, or at least 50 carbon atoms. The number of carbon atoms can be up to 600 or even greater. The R$^3$ group can contain up to 550 carbon atoms, up to 500 carbon atoms, up to 450 carbon atoms, up to 400 carbon atoms, up to 350 carbon atoms, up to 300 carbon atoms, up to 250 carbon atoms, up to 200 carbon atoms, up to 150 carbon atoms, or up to 100 carbon atoms. For example, the R$^3$ group can have 25 to 600 carbon atoms, 25 to 500 carbon atoms, 25 to 400 carbon atoms, 25 to 300 carbon atoms, 25 to 200 carbon atoms, or 25 to 100 carbon atoms.

Suitable alkyl groups for R$^2$ in Formula (I) often have 1 to 10 carbon atoms, 1 to 8 carbon atoms, 1 to 6 carbon atoms, or 1 to 4 carbon atoms. The alkyl group can be linear, branched, cyclic, or a combination thereof. In many embodiments, R$^2$ is methyl. That is, the terminal groups of the reactive liquid modifier can be acetoacetoxy groups.

The reactive liquid modifiers of Formula (I) can be prepared, for example, by reacting an alkyl acetoacetoxy compound with a poly(alkylene oxide) diol. The reaction of a hydroxyl-containing material with an alkyl acetoacetoxy compound is described in the article by J. S. Witzeman et al. in *J. Org. Chem.*, 56(5), 1713-1718, 1991. Suitable poly(alkylene oxide) diols can have any suitable molecular weight to provide an R$^3$ group having greater than 20 carbon atoms. The poly(alkylene oxide) diols are typically selected from a poly(tetramethylene oxide) diol (i.e., a poly(tetramethylene oxide) diol can also be referred to as poly(tetrahydrofuran) diol), a polypropylene oxide) diol, or a poly(ethylene oxide) diol. Suitable alkyl acetoacetoxy compounds often have an alkyl group with tertiary carbon such as in a tert-butyl group.

Alternatively, the reactive liquid modifiers of Formula (I) can be prepared by reacting a diketone with hydroxyl functional materials as described by R. J. Clemens in *Chem. Rev.*, 86, 241 (1986).

The reactive liquid modifier of Formula (I) is typically not reactive with the epoxy resin but is reactive with the curing agent. The reactive liquid modifier is usually added to the first part of the curable adhesive composition to minimize premature reaction with the curing agent in the second part. The reactive liquid modifier is typically not reactive at room temperature with the secondary curatives and can be mixed with such materials in the first part of the curable adhesive composition.

The reactive liquid modifier can react with the curing agent having primary amino groups, secondary amino groups, or a mixture of primary and secondary amino groups. The primary amino or secondary amino groups can react with the terminal carbonyl group of the reactive liquid modifier. For purposes of simplicity, the reaction of a single primary amino group of the curing agent (H$_2$N—R$^5$—NH$_2$) with one terminal carbonyl group of the reactive liquid modifier is shown in the following reaction.

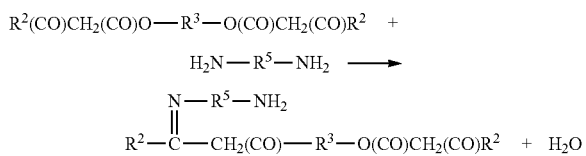

This reaction between the curing agent and the reactive liquid modifier typically occurs at a faster rate than the reaction between the curing agent and the epoxy resin. Any curing agent not consumed by the reaction with the reactive liquid modifier can then be reacted with the epoxy resin.

The curable adhesive composition often contains at least 3 weight percent of the reactive liquid modifier based on a total weight of the curable adhesive composition. The reactive liquid modifier is often present in an amount equal to at least 4 weight percent, at least 5 weight percent, at least 7 weight percent, or at least 10 weight percent based on the total weight of the curable adhesive composition. The curable adhesive composition often contains up to 20 weight percent of the reactive liquid modifier. This amount can be up to 18 weight percent, up to 15 weight percent, or up to 12 weight percent. For example, the reactive liquid modifier is often in the range of 3 to 20 weight percent, 4 to 20 weight percent, 4 to 15 weight percent, 4 to 12 weight percent, 4 to 10 weight percent, or 5 to 10 weight percent based on the total weight of the curable adhesive composition.

If the curing reaction occurs at room temperature, the curing agent in the curable adhesive composition, the ratio of amine hydrogen equivalent weight to epoxy equivalent weight is often at least 0.5:1, at least 0.8:1, or at least 1:1. The ratio can up be to 2:1 or up to 1.5:1. For example, the ratio can be in the range of 0.5:1 to 2:1, in the range of 0.5:1 to 1.5:1, in the range of 0.8:1 to 2:1, in the range of 0.8:1 to 1.5:1, in the range of 0.8:1 to 1.2:1, in the range of 0.9:1 to 1.1:1, or about 1:1. The ratio is often selected so that there is sufficient amine curing agent present to react with both the epoxy resin and the reactive liquid modifier.

If the curing temperature occurs at elevated temperatures (e.g., temperatures above 100° C. or above 120° C. or above 150° C.), however, a lower amount of the amine curing agent is often used. The amount of the curing agent in the curable adhesive composition is often present in a sufficient molar amount to react with the reactive liquid modifier and with a portion of the epoxy resin. For example, the ratio of amine hydrogen equivalent weight to epoxy equivalent weight is often less than 1:1 such in the range of 0.2:1 to 0.8:1, in the range of 0.2:1 to 0.6:1, or in the range of 0.3:1 to 0.5:1. Any epoxy resin that is not reacted with the curing agent tends to undergo homopolymerization at elevated temperatures.

The cured adhesive composition is less likely to crack or break upon impact when the reactive liquid modifier is included in the curable adhesive composition. That is, the reactive liquid modifier typically improves the impact peel strength of the cured adhesive composition. The impact peel strength is usually greater than 13 Newtons per millimeter (N/mm), greater than 15 N/mm, greater than 20 N/mm, greater than 25 N/mm, or greater than 30 N/mm.

The curable adhesive compositions also include a toughening agent. The toughening agents are polymers other than the curable epoxy resins or the reactive liquid modifiers that are capable of enhancing the toughness of the cured adhesive composition. The toughness can be characterized by measuring the T-peel strength of the cured adhesive compositions. T-peel strength is often greater than 30 $lb_f$/in-width (i.e., 30 foot-pounds per inch width), which is equal to 131 Newton per 25 mm (i.e., 131 N/25 mm). The T-peel strength can be greater than 40 $lb_f$/in-width (175 N/25 mm), greater than 50 $lb_f$/in-width (219 N/25 mm), or greater than 60 $lb_f$/in-width (263 N/25 mm). The toughening agents can be added to the first part of the curable adhesive composition with the epoxy resin and reactive liquid modifier, to the second part of the curable adhesive composition with the curing agent, or to both the first and second part of the curable adhesive composition. Typical toughening agents include core-shell polymers, butadiene-nitrile rubbers, acrylic polymers and copolymers, and the like.

Some toughening agents are core-shell polymers. A shell polymeric material is typically grafted to a core polymeric material. The core is usually an elastomeric material with a glass transition temperature less than 0° C. The shell is usually a polymeric material having a glass transition temperature greater than 25° C. The glass transition temperature can be determined using dynamic mechanical thermal analysis (DMTA) or a similar method.

The core of the core-shell polymeric toughening agents is often prepared from a butadiene polymer or copolymer, a styrene polymer or copolymer, an acrylonitrile polymer or copolymer, an acrylate polymer or copolymer, or combinations thereof. These polymers or copolymers can be cross-linked or not cross-linked. Some exemplary shells are polymethylmethacrylates that are either non-crosslinked or crosslinked. Other exemplary shells are butadiene-styrene copolymers that are either non-crosslinked or crosslinked.

The shell of the core-shell polymeric toughening agents are often formed from a styrene polymer or copolymer, a methacrylate polymer or copolymer, an acrylonitrile polymer or copolymer, or combinations thereof. The shell can be further functionalized with epoxy groups, acidic groups, or acetoacetoxy groups. Functionalization of the shell may be achieved, for example, by copolymerization with glycidyl-methacrylate or acrylic acid or by reaction of a hydroxy group with an alkyl acetoacetoxy such as tert-butyl acetoacetoxy. The addition of these functional groups can result in the shell being crosslinked into the polymeric matrix.

Suitable core-shell polymers often have an average particle size equal to at least 20 nanometers, at least 50 nanometers, at least 100 nanometers, at least 150 nanometers, or at least 200 nanometers. The average particle size can be up to 400 nanometers, up to 500 nanometers, up to 750 nanometers, or up to 1000 nanometers. The average particle size can be, for example, in the range of 10 to 1000 nanometers, in the range of 50 to 1000 nanometers, in the range of 100 to 750 nanometers, or in the range of 150 to 500 nanometers.

Exemplary core-shell polymers and their preparation are described in U.S. Pat. No. 4,778,851 (Henton et al.). Commercially available core-shell polymers can be obtained, for example, under the trade designation PARALOID (e.g., PARALOID EXL 2600 and PARALOID EXL 2691) from Rohm & Haas Company in Philadelphia, Pa. and under the trade designation KANE ACE (e.g., KANE ACE MX120 and KANE ACE MX153) from Kaneka in Belgium.

Still other toughening agents can be prepared by reacting amino-terminated materials or carboxy-terminated materials with an epoxy resin to prepare an adduct that phase separates from the other components in the cured adhesive composition. Suitable amino-terminated materials that can be used to prepare such toughening agents include, but are not limited to, those commercially available under the trade designation DYNAMAR POLYETHERDIAMINE HC 1101 from 3M Corporation in Saint Paul, Minn. Suitable carboxy-terminated materials include carboxy-terminated butadiene acrylonitrile copolymers such as those commercially available from Emerald Chemical in Alfred, Me.

The curable adhesive compositions often include at least 5 weight percent of the toughening agent based on a total weight of the curable adhesive composition. For example, the curable adhesive compositions can include at least 10 weight percent, at least 15 weight percent, at least 20 weight percent, or at least 25 weight percent of the toughening agent. The amount of the toughening agent often can be up to 55 weight percent based on a total weight of the curable adhesive composition. For example, the curable adhesive composition can include up to 50 weight percent, up to 45 weight percent, up to 40 weight percent, up to 35 weight percent, up to 30 weight percent, or up to 25 weight percent of the toughening agent. In some embodiments, the curable adhesive composition contains 5 to 55 weight percent, 5 to 50 weight percent, 5 to 40 weight percent, 5 to 30 weight percent, 5 to 20 weight percent, or 5 to 15 weight percent of the toughening agent.

In addition to the epoxy resin, curing agent, reactive liquid modifier, and toughening agent, the curable adhesive compositions further include an oil displacing agent that is soluble in the curable adhesive composition. The oil displacing agent can be added to the first part of the curable adhesive composition containing the epoxy resin and the reactive liquid modifier, to the second part of the curable adhesive composition containing the curing agent, or to both the first part and the second part. The oil displacing agent is added to promote adhesion between the cured adhesive composition and the surface of a substrate that is contaminated with a hydrocarbon-containing material.

As used herein, the term "hydrocarbon-containing material" refers to a variety of substances that can contaminate the surface of the substrate during processing, handling, storage, or combinations thereof. Examples of hydrocarbon-containing materials include, but are not limited to, mineral oils, fats, dry lubricants, deep drawing oils, corrosion protection agents, lubricating agents, waxes, and the like. The surface of the substrate may contain other contaminants in addition to the hydrocarbon-containing material. While not wishing to be bound by theory, the oil displacing agent may facilitate transfer of the hydrocarbon-containing away from the surface of the substrate and into the bulk of the curable adhesive composition. This transfer away from the surface of the substrate may result in improved adhesive bond strength. Sufficient adhesive bond strength can often be obtained without the need for a heat curing step.

The oil displacing agents are usually liquids at room temperature. These agents are typically capable of disrupting or displacing hydrocarbon-containing material at the surface of the substrate while remaining miscible both with the curable adhesive composition during application and with the resulting cured adhesive composition. Suitable oil displacing agents often have a surface tension that is lower than that of the hydrocarbon-containing material and a solubility parameter similar to that of the hydrocarbon-containing material.

The oil displacing agents usually have a surface tension up to 35 dynes per centimeter (dynes/cm). For example, the surface tension can be up to 35 dynes/cm, up to 32 dynes/cm, up to 30 dynes/cm, or up to 25 dynes/cm. The surface tension is often at least 15 dynes/cm, at least 18 dynes/cm, or at least 20 dynes/cm. For example, the surface tension can be in the range of 15 to 35 dynes/cm, in the range of 15 to 32 dynes/cm, in the range of 15 to 30 dynes/cm, in the range of 20 to 35 dynes/cm, in the range of 20 to 30 dynes/cm, in the range of 25 to 35 dynes/cm, or in the range of 25 to 30 dynes/cm. The surface tension can be measured, for example, using the so-called pendant drop test (also referred to as the pendant drop shape analysis method) as specified in the article by F. K. Hansen et al. in *J. Coll. and Inter. Sci.*, 141, 1-12 (1991).

If the hydrocarbon-containing material on the surface of the substrate is known, the oil displacing agent can be selected to have a surface tension that is less than the surface tension of the hydrocarbon-containing material. More specifically, the oil displacing agent can be selected to have a surface tension that is at least 2.5 dynes/cm less than that of the hydrocarbon-containing material. For example, the surface tension of the oil displacing agent can be at least 4.0 dynes/cm less than, at least 8.0 dynes/cm less than, or at least 12.0 dynes/cm less than that of the hydrocarbon-containing material.

In many embodiments, the solubility parameter of the oil displacing agent is in the range of 6 to 12 $cal^{0.5}/cm^{1.5}$. For example, the solubility parameter can be in the range of 7 to 12 $cal^{0.5}/cm^{1.5}$, in the range of 8 to 12 $cal^{0.5}/cm^{1.5}$, in the range of 7 to 10.5 $cal^{0.5}/cm^{1.5}$, in the range of 7 to 9 $cal^{0.5}/cm^{1.5}$ or in the range of 7.5 to 9 $cal^{0.5}/cm^{1.5}$. The solubility parameter can be calculated with software commercially available under the trade designation MOLECULAR MODELING PRO from ChemSW, Inc. of Fairfield, Calif. using the method described by D. W. van Krevelen in the book Properties of Polymers: Their Correlation with Chemical Structure: Their Numerical Estimation and Prediction form Additive Group Contributions, 4$^{th}$ edition, pp. 200-225, 1990, published by Elsevier in Amsterdam, The Netherlands.

Empirical methods can be used to identify suitable oil displacing agents for a particular application. For example, approximately 20 to 100 microliters of a candidate oil displacing agent can be gently deposited on the surface of an substrate covered with a film of the hydrocarbon-containing material. Suitable candidate oil displacing agents will typically spread out and cause the film of hydrocarbon-containing material to rupture. While not wishing to be bound by theory, suitable oil displacing agents are believed to at least partially dissolve the hydrocarbon-containing material and/or to at least partially diffuse into the hydrocarbon-containing material. The droplet of suitable oil displacing agents tends to push the hydrocarbon-containing material outward from the impact area.

Although empirical methods can facilitate the relatively quick identification of potential oil displacing agents, not all compounds that pass such a test can be used successfully as oil displacing agents based on other considerations. For example, some compounds can cause film rupture but are too volatile in the curable adhesive compositions or not suitably miscible with the curable adhesive composition to be effective as oil displacing agents.

Many different classes of compounds are suitable for the oil displacing agent. Suitable types of compounds include, but are not limited to, glycidyl esters, cyclic terpenes, cyclic terpene oxides, mono-esters, di-esters, tri-esters, trialkyl phosphates, epoxy alkanes, alkyl methacrylates, and vinyl alkyl esters. The oil displacing agent is typically not a glycidyl ether.

Some oil displacing agents are glycidyl esters of Formula (V).

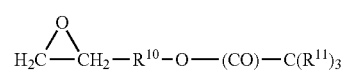

(V)

In Formula (V), group $R^{10}$ is an alkylene having 1 to 18 carbon atoms, 1 to 12 carbon atoms, 1 to 10 carbon atoms, 1 to 8 carbon atoms, 1 to 6 carbon atoms, or 1 to 4 carbon atoms. In some exemplary compounds of Formula (V), group $R^{10}$ is methylene. Each group $R^{11}$ is independently a linear or branched alkyl have 1 to 12 carbon atoms, 1 to 10 carbon atoms, 1 to 8 carbon atoms, 1 to 6 carbon atoms, or 1 to 4 carbon atoms. One exemplary compound of Formula (V) is commercially available under the trade designation CARDURA N10 from Hexion Specialty Chemicals in Columbus, Ohio. This oil displacing agent is a glycidyl ester of a highly branched tertiary carboxylic acid (neodecanoic acid) having 10 carbon atoms.

Some oil displacing agents are esters. Suitable monoesters can be of Formula (VI).

$$R^{13}\!-\!O\!-\!(OC)\!-\!R^{12} \qquad (VI)$$

In Formula (VI), the group $R^{13}$ is usually a linear or branched alkyl having 1 to 20 carbon atoms, 1 to 18 carbon atoms, 1 to 12 carbon atoms, or 1 to 8 carbon atoms. Group $R^{12}$ is an alkyl, an alkene-yl (i.e., an alkene-yl is a monovalent radical of an alkene), an aryl, or an arylalkyl. Suitable alkyl and alkene-yl groups for $R^{12}$ often have 6 to 20 carbon atoms, 8 to 20 carbon atoms, 8 to 18 carbon atoms, or 8 to 12 carbon atoms. The alkyl and alkene-yl can be unsubstituted or substituted with a hydroxyl group, an amino group, an aryl group, or alkylaryl. Suitable amino group substituents are of formula —$N(R^1)_2$ where each $R^1$ is independently an hydrogen, alkyl, aryl, or alkylaryl. Suitable aryl groups for $R^1$, $R^{12}$, and substituents often have 6 to 12 carbon atoms. The aryl group is often phenyl. Suitable alkyl groups for $R^1$ often have 1 to 10 carbon atoms, 1 to 6 carbon atoms, or 1 to 4 carbon atoms. Suitable arylalkyl groups for $R^1$, $R^{12}$, and substituents often have an alkyl portion with 1 to 12 carbon atoms, 1 to 8 carbon atoms, or 1 to 4 carbon atoms and an aryl portion having 6 to 12 carbon atoms such as phenyl. Exemplary oil displacing agents of Formula (VI) include, but are not limited to, alkyl oleates such as methyl oleate and alkyl benzoates such as isodecyl benzoate.

Suitable di-esters of use as oil displacing agents can be of Formula (VII).

$$R^{14}O(OC)\!-\!R^{15}\!-\!(CO)OR^{14} \qquad (VII)$$

In Formula (VII), each group $R^{14}$ independently is a linear or branched alkyl having at least 3 carbon atoms such as 3 to 20 carbon atoms, 3 to 18 carbon atoms, 3 to 12 carbon atoms, or 3 to 8 carbon atoms. Group $R^{15}$ is an alkane-diyl (i.e., an alkane-diyl is a divalent radical of an alkane and can be referred to as an alkylene), a heteroalkane-diyl (i.e., a heteroalkane-diyl is a divalent radical of a heteroalkane and can be referred to as a heteroalkene), or an alkene-diyl (i.e., an alkene-diyl is a divalent radical of an alkene). The alkane-diyl, heteroalkane-diyl, and alkene-diyl have at least 2 carbon atoms and often have 2 to 20 carbon atoms, 2 to 16 carbon atoms, 2 to 12 carbon atoms, or 2 to 8 carbon atoms. The heteroatom in the heteroalkylene-diyl can be oxy, thio, or —NH—. The alkane-diyl, heteroalkane-diyl, and alkene-diyl can be unsubstituted or substituted with a hydroxyl group, an amino group, an aryl group, or alkylaryl group. Suitable amino group substituents are of formula —$N(R^1)_2$ where $R^1$ is an hydrogen, alkyl, aryl, or alkylaryl. Suitable aryl groups for $R^1$ and substituents often have 6 to 12 carbons such as a phenyl group. Suitable alkylaryl groups for $R^1$ and substituents often have an alkyl portion with 1 to 12 carbon atoms, 1 to 8 carbon atoms, or 1 to 4 carbon atoms and an aryl portion with 6 to 12 carbon atoms such as phenyl. Suitable alkyl groups for $R^1$ often have 1 to 12 carbon atoms, 1 to 8 carbon atoms, or 1 to 4 carbon atoms. Exemplary di-esters of Formula (VII) include, but are not limited to, dialkyl maleates such as diethylhexyl maleate, dialkyl adipates such as diisobutyl adipate, dialkyl succinates such as diisobutyl succinate, dialkyl glutarates such as diisobutyl glutarate, dialkyl fumarates such as dibutyl fumarate, and dialkly glutamates such as dibutyl glutamate.

Suitable tri-esters for use as oil displacing agents can be of Formula (VIII).

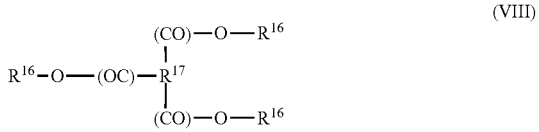

In Formula (VIII), each $R^{16}$ group independently is a linear or branched alkyl having at least 3 carbon atoms such as 3 to 20 carbon atoms, 3 to 18 carbon atoms, 3 to 12 carbon atoms, or 3 to 8 carbon atoms. Group $R^{17}$ is an alkane-triyl (i.e., an alkane-triyl is a trivalent radical of an alkane), heteroalkane-triyl (i.e., a heteroalkane-triyl is a trivalent radical of a heteroalkane), or alkene-triyl (i.e., a alkene-triyl is a trivalent radical of an alkene). The alkane-triyl, heteroalkane-triyl, and alkene-triyl have at least 2 carbon atoms and often have 2 to 20 carbon atoms, 2 to 16 carbon atoms, 2 to 12 carbon atoms, or 2 to 8 carbon atoms. The heteroatom in the heteroalkylene-diyl can be oxy, thio, or —NH—. The alkane-triyl, heteroalkane-triyl, and alkene-triyl can be unsubstituted or substituted with a hydroxyl group, an amino group, an aryl group, or alkylaryl group. Suitable amino group substituents are of formula —$N(R^1)_2$ where $R^1$ is an hydrogen, alkyl, aryl, or alkylaryl. Suitable aryl groups for $R^1$ and substituents often have 6 to 12 carbons such as a phenyl group. Suitable alkylaryl groups for $R^1$ and substituents often have an alkyl portion with 1 to 12 carbon atoms, 1 to 8 carbon atoms, or 1 to 4 carbon atoms and an aryl portion with 6 to 12 carbon atoms such as phenyl. Suitable alkyl groups for $R^1$ often have 1 to 12 carbon atoms, 1 to 8 carbon atoms, or 1 to 4 carbon atoms. Exemplary compounds of Formula (VIII) include, but are not limited to, trialkyl citrates such as tributyl citrate.

The oil displacing agent can be selected from an epoxy alkane of Formula (IX).

In Formula (IX), group $R^{18}$ is an alkyl or perfluoroalkyl. The alkyl or perfluoroalkyl group can be linear, branched, cyclic, or a combination thereof. The alkyl or perfluoroalkyl group often has at least 3 carbon atoms such as 3 to 20 carbon atoms, 4 to 20 carbon atoms, 4 to 18 carbon atoms, 4 to 12 carbon atoms, or 4 to 8 carbon atoms. Exemplary compounds of Formula (IX) include, but are not limited to, 1H,1H,2H-perfluoro(1,2-epoxy)hexane, 3,3-dimethyl-1,2-epoxybutane, 1,2-epoxyoctane, 1,2-epoxyhexane, 1,2-epoxybutane, 1,2-epoxydodecane, 1,2-epoxydecane, and 1,2-epoxycyclopentane.

Suitable cyclic terpenes for use as oil displacing agents include, but are not limited to, limonene, alpha-pinene, beta-pinene, 1,8-cineole, and the like. Suitable cyclic terpene oxides include, but are not limited to, limonene oxide and alpha-pinene oxide.

Trialkyl phosphates suitable for use as oil displacing agents often have alkyl groups with 2 to 10 carbon atoms. Some exemplary trialkyl phosphates include, but are not limited to, tripropyl phosphate, triethylphosphate, and tributyl phosphate.

Alkyl methacarylates that can be used as oil displacing agents often include an alkyl group with at least 4 carbon atoms, at least 6 carbon atoms, or at least 8 carbon atoms.

For example, the alkyl group can have 6 to 20 carbon atoms, 6 to 18 carbon atoms, 6 to 12 carbon atoms, or 6 to 10 carbon atoms. The alkyl in the alkyl methacrylate can be cyclic, linear, branched, or a combination thereof. Examples include, but are not limited to, isodecyl methacrylate, 3,3, 5-trimethylcyclohexyl methacrylate.

Vinyl alkyl esters suitable for use as oil displacing agents often have an alkyl group that has at least 2 carbon atoms, at least 4 carbon atoms, or at least 6 carbon atoms. For example, the alkyl group can have 2 to 20 carbon atoms, 4 to 20 carbon atoms, 4 to 18 carbon atoms, 4 to 12 carbon atoms, or 4 to 8 carbon atoms. The alkyl in the vinyl alkyl ester can be cyclic, linear, branched, or a combination thereof. Examples include, but are not limited to, VEOVA 10, a vinyl ester of a highly branched carboxylic acid having 10 carbon atoms. VEOVA 10 is a trade designation of Hexion Specialty Chemicals in Columbus, Ohio.

Alkyl trialkoxysilane compounds that can be used as an oil displacing agent often include an alkyl group having 1 to 10 carbon atoms, 2 to 10 carbon atoms, or 2 to 6 carbon atoms. The alkyl group can be unsubstituted or substituted with an amino group such as a primary amino group. The alkoxy groups often have 1 to 6 carbon atoms, 1 to 4 carbon atoms, or 1 to 3 carbon atoms. Examples include, but are not limited to, 3-aminopropyltriethoxysilane.

Table 1 includes surface tension values and solubility parameter values for exemplary oil displacing agents.

TABLE 1

Characteristics of Various Oil Displacing Agents

| Oil Displacing Agent | Surface Tension (dynes/cm) | Solubility Parameter ($cal^{0.5}/cm^{1.5}$) |
|---|---|---|
| 1H,1H,2H-Perfluoro(1,2-Epoxy)hexane | 15.6 | 9.43 |
| 3-[2-(Perfluorohexyl)ethoxy]1,2-Epoxypropane | 18.3 | 9.17 |
| 3,3-Dimethyl-1,2-Epoxybutane | 21.4 | 8.11 |
| 1,2-Epoxyoctane | 23.2 | 8.12 |
| 1,2-Epoxyhexane | 23.9 | 8.31 |
| 1,2-Epoxybutane | 24.3 | 8.31 |
| 1,2-Epoxydodecane | 25.1 | 8.08 |
| 1,2,7,8-Diepoxyoctane | 26.6 | 9.07 |
| 1,2-Epoxydecane | 27.8 | 8.10 |
| 1,2-Epoxycyclopentane | 30.4 | 9.13 |
| Cyclohexene Oxide | 31.6 | 8.93 |
| 3-aminopropyltriethoxysilane | 23.5 | 9.37 |
| VEOVA 10 | 23.8 | 8.42 |
| α-Pinene | 26.3 | 8.06 |
| β-Pinene | 27.8 | 8.33 |
| Limonene | 26.9 | 8.02 |
| 1,8-Cineole | 29.3 | 8.65 |
| β-Pinene Oxide | 30.2 | 9.00 |
| Limonene Oxide | 31.4 | 8.80 |
| α-Pinene Oxide | 31.4 | 8.89 |
| Methyl Oleate | 29.0 | 8.19 |
| Isodecyl Benzoate | 29.6 | 9.19 |
| Dimethyl Adipate | 31.2 | 9.58 |
| Dibutyl Maleate | 27.6 | 9.08 |
| Dibutyl Fumarate | 28.7 | 9.08 |
| Diethylhexyl Maleate | 25.6 | 8.60 |
| Triethyl Citrate | 32.1 | 11.10 |
| Tributyl Citrate | 26.9 | 10.24 |
| Tributyl Phosphate | 26.9 | 9.17 |
| CARDURA N-10 | 28.9 | 8.84 |
| 3,3,5-Trimethylcyclohexyl Methacrylate | 26.7 | 8.10 |
| 1,3-Bis(Glycidoxypropyl)-tetramethyldisiloxane | 30.4 | 8.63 |
| 2,(3,4-Epoxycyclohexyl)-Ethyl Trimethoxysilane | 31.2 | 8.70 |

The curable adhesive compositions often contain at least 0.01 weight percent of the oil displacing agent based on a total weight of the curable adhesive composition. The amount is often at least 0.05 weight percent, at least 0.1 weight percent, at least 0.2 weight percent, at least 0.5 weight percent, or at least 1 weight percent. The curable adhesive composition can include up to 25 weight percent, up to 20 weight percent, up to 15 weight percent, or up to 10 weight percent of the oil displacing agent. In many embodiments, the oil displacing agent is present in an amount in the range of 0.1 to 25 weight percent, in the range of 0.5 to 20 weight percent, in the range of 1 to 20 weight percent, in the range of 1 to 10 weight percent, or in the range of 2 to 10 weight percent.

Some curable adhesive compositions contain at least 20 weight percent epoxy resin, at least 3 weight percent curing agent, at least 5 weight percent reactive liquid modifier, at least 5 weight percent toughening agent, and at least 0.1 weight percent oil displacing agent based on a total weight of the curable adhesive composition. Some exemplary curable adhesive compositions contain 20 to 90 weight percent epoxy resin, 3 to 30 weight percent curing agent, 3 to 20 weight percent reactive liquid modifier, 5 to 55 weight percent toughening agent, and 0.1 to 25 weight percent oil displacing agent based on a total weight of the curable adhesive composition.

Other exemplary curable adhesive compositions contain 20 to 70 weight percent epoxy resin, 3 to 20 weight percent curing agent, 4 to 15 weight percent reactive liquid modifier, 5 to 40 weight percent toughening agent, and 0.5 to 20 weight percent oil displacing agent. Still other exemplary curable adhesive compositions contain 30 to 60 weight percent epoxy resin, 5 to 20 weight percent curing agent, 4 to 10 weight percent reactive liquid modifier, 5 to 30 weight percent toughening agent, and 1 to 10 weight percent oil displacing agent. The amounts are based on the total weight of the curable adhesive composition.

Other optional components such as fillers can be added to the curable adhesive compositions. The fillers can be added to the first part of the curable adhesive composition, to the second part of the curable adhesive composition, or to both the first part and the second part of the curable adhesive composition. Fillers are often added to promote adhesion, to improve corrosion resistance, to control the rheological properties of the adhesive, to reduce shrinkage during curing, to accelerate curing, to absorb contaminants, to improve heat resistance, or for a combination thereof. The fillers can be inorganic material, organic materials, or composite materials containing both inorganic and organic materials. The fillers can have any suitable size and shape. Some fillers are in the form of particles with spherical, elliptical, or platelet shapes. Other fillers are in the form of fibers.

Some fillers are inorganic fibers such as fiber glass (e.g., glass wool and glass filament), mineral wool (e.g., rock wool and slag wool), and refractory ceramic fibers. Some exemplary inorganic fibers include a mixture of $SiO_2$, $Al_2O_3$, or a combination thereof. The inorganic fibers can further include CaO, MgO, $Na_2O$, $K_2O$, $Fe_2O_3$, $TiO_2$, other oxides, or mixtures thereof. Exemplary inorganic fibers are commercially available under the trade designation COATFORCE (e.g., COATFORCE CF50 and COATFORCE CF10) from Lapinus Fibres BV in Roermond, The Netherlands. Other exemplary inorganic fibers can be prepared from wollastonite (i.e., calcium silicate).

Other fillers are organic fibers such as aramid fibers and polyolefin fibers such as polyethylene fibers. These organic fibers can be untreated or treated to change their hydrophobic or hydrophilic character. For example, some organic fibers are specially treated to make them hydrophobic or to increase their hydrophobicity. The fibers can be fibrillated. Exemplary polyolefin fibers include high-density polyethylene fibers such as those available under the trade designation SYLOTHIX (e.g., SYLOTHIX 52 and SYLOTHIX 53) from EP Minerals in Reno, Nev., those available under the trade designation ABROTHIX (e.g., ARBOTHIX PE100) from EP Minerals, those available under the trade designation SHORT STUFF (e.g., SHORT STUFF ESS2F and SHORT STUFF ESS5F) from MiniFIBERS, Inc. in Johnson City, Tenn., and those available under the trade designation INHANCE (e.g., INHANCE PEF) from Inhance/Fluoro-Seal, Limited in Houston, Tex. Exemplary aramid fibers are commercially available under the trade designation INHANCE (e.g., INHANCE KF) from Inhance/Fluoro-Seal, Ltd. in Houston, Tex.

Other suitable fillers include silica-gels, calcium silicates, calcium nitrate, calcium phosphates, calcium molybdates, calcium carbonate, calcium hydroxide, fumed silica, clays such as bentonite, organo-clays, aluminium trihydrates, glass microspheres, hollow glass microspheres, polymeric microspheres, and hollow polymeric microspheres. The fillers can also be a pigment such as ferric oxide, brick dust, carbon black, titanium oxide and the like. Any of these filler can be surface modified to make them more compatible with the curable or cured adhesive composition.

Exemplary fillers include a mixture of synthetic amorphous silica and calcium hydroxide that is commercially available from W.R. Grace in Columbia, Md. under the trade designation SHIELDEX (e.g., SHIELDEX AC5), a fumed silica treated with polydimethylsiloxane to prepare a hydrophobic surface that is available from Cabot GmbH in Hanau, Germany under the trade designation CAB-O-SIL (e.g., CAB-O-SIL TS 720), a hydrophobic fumed silica available from Degussa in Düsseldorf, Germany under the trade designation AEROSIL (e.g., AEROSIL VP-R-2935), glass beads class IV (250 to 300 micrometers) from CVP S.A. in France, and epoxysilane-functionalized (2 wt %) aluminium trihydrate available under the trade designation APYRAL 24 ESF from Nabaltec GmbH in Schwandorf, Germany.

In some embodiments, fillers with oleophilic surfaces are included in the curable adhesive compositions. Without wishing to be bound by theory, it is believed these fillers may absorb at least some of the hydrocarbon-containing material at the surface of a substrate thus enhancing the adhesive bond.

The curable adhesive composition can contain any suitable amount of the filler. In many embodiments, the curable adhesive composition contains 0.01 to 50 weight percent filler based on a total weight of the curable adhesive composition. For example, the amount can be in the range of 0.5 to 50 weight percent, in the range of 1 to 40 weight percent, in the range of 1 to 30 weight percent, in the range of 1 to 20 weight percent, in the range of 1 to 10 weight percent, in the range of 5 to 30 weight percent, or in the range of 5 to 20 weight percent.

The curable adhesive composition can include any number of other optional components. For example, an optional adhesion promoter can be added. Exemplary adhesion promoters include, but are not limited to, various silane compounds. Some silane compounds that are suitable for adhesion promoters have amino groups or glycidyl groups that can react with one or more components in the curable adhesive composition. Other exemplary adhesive promoters include various chelating agents such as those described in U.S. Pat. No. 6,632,872 (Pellerite et al.) and various chelate-modified epoxy resins such as those available from Adeka Corporation in Tokyo, Japan under the trade designation EP-49-10N and EP-49-20.

Solvents can be included in curable adhesive composition. The solvents are typically selected to be miscible with the curable adhesive composition. Solvents can be added to lower the viscosity of either the first part or the second part of the curable adhesive composition or can be added with one of the various components included in the curable adhesive composition. The amount of solvent is typically minimized and is often less than 10 weight percent based on a total weight of the curable adhesive composition. The solvent is often less than 8 weight percent, less than 6 weight percent, less than 4 weight percent, less than 2 weight percent, less than 1 weight percent, or less than 0.5 weight percent based on the total weight of the curable adhesive composition. Suitable organic solvents include those that are soluble in the curable adhesive composition and that can be removed during or after curing to form the cured adhesive composition. Exemplary organic solvents include, but are not limited to, toluene, acetone, various alcohols, and xylene.

The curable adhesive composition typically is in the form of a first part and a second part. The first part typically includes the epoxy resins, the reactive liquid modifier, plus other components that do not react with either the epoxy resin or the reactive liquid modifier. The second part typically includes the curing agent plus any other components that do not typically react with the curing agent. The toughening agent and the oil displacing agent can each be added independently to either the first part or the second part. The components in each part are typically selected to minimize reactivity within each part.

Alternatively, the curable composition can include additional parts such as a third part that can contain additional components or that can further separate the components of the curable adhesive composition. For example, the epoxy resin can be in a first part, the curing agent can be in a second part, and the reactive liquid modifier can be in a third part. The toughening agent and the oil displacing agent can each independently be in any of the first, second, or third parts.

The various parts of the curable adhesive composition are mixed together to form the cured adhesive composition. These parts are typically mixed together immediately prior to use of the curable adhesive composition. The amount of each part included in the mixture can be selected to provide the desired molar ratio of oxirane groups to amine hydrogen atoms and the desired molar ratio of reactive liquid modifier to amine hydrogen atoms.

The curable adhesive composition can be cured at room temperature, can be cured at room temperature and then at an elevated temperature (e.g., greater than 100° C., greater than 120° C., or greater than 150° C.), or can be cured at an elevated temperature. In some embodiments, the adhesive can be cured at room temperature for at least 3 hours, at least 6 hours, at least 12 hours, at least 18 hours, at least 24 hours, at least 48 hours, or at least 72 hours. In other embodiments, the adhesive can be cured at room temperature for any suitable length of time and then further cured at an elevated temperature such as, for example, 180° C. for a time up to 10 minutes, up to 20 minutes, up to 30 minutes, up to 60 minutes, up to 120 minutes, or even longer than 120 minutes.

The adhesive compositions may reach a desirable cohesive strength after short heat curing periods. Since the cohesive strength can often increases upon further curing under the same or different conditions, this kind of curing is referred to herein as partial curing. In principle, partial curing can be carried out using any kind of heating. In some embodiments, induction curing (e.g., spot induction curing or ring induction curing) may be used for partial curing. Induction curing is a non-contact method of heating using electric power to generate heat in conducting materials by placing an inductor coil through which an alternating current is passed in proximity to the cured adhesive composition. The alternating current in the work coil sets up an electromagnetic field that creates a circulating current in the work piece. This circulating current in the work piece flows against the resistivity of the material and generates heat. Induction curing equipment can be commercially obtained, for example, EWS from IFF-GmbH in Ismaning, Germany. The induction curing can occur, for example, at temperatures in the range of 80° C. to 180° C. with exposure times up to 120 seconds, up to 90 seconds, up to 60 seconds, up to 45 seconds, or up to 30 seconds. In yet a further embodiment, adhesive compositions may undergo an induction cure, followed by further curing at room temperature, an elevated temperature, or both.

The cured adhesive compositions often form a robust bond with one or more substrates. A bond is typically considered to be robust if the bond breaks apart cohesively at high shear values when tested in an overlap shear test and if high T-peel strength values are obtained when tested in a T-peel test. The bonds may break in three different modes: (1) the adhesive splits apart, leaving portions of the adhesive adhered to both metal surfaces in a cohesive failure mode; (2) the adhesive pulls away from either metal surface in an adhesive failure mode; or (3) a combination of adhesive and cohesive failure (i.e., mixed mode failure).

The cured adhesive composition can typically adhere to clean metal surfaces and to metal surfaces contaminated with hydrocarbon-containing materials such as various oils and lubricants. The cured adhesive composition often has a cohesive strength, as measured by overlap shear strength, of at least 2500 psi (17.2 MPa). For example, overlap shear strength can be at least 3000 psi (20.7 MPa), at least 3200 psi (22.1 MPa), or at least 3500 psi (24.1 MPa).

The cured adhesive compositions may be used to supplement or completely eliminate a weld or mechanical fastener by applying the curable adhesive composition between two parts (i.e., between two surfaces of two substrates) to be joined and curing the adhesive to form a bonded joint. Suitable substrates onto which the adhesive of the present invention may be applied include metals (e.g., steel, iron, copper, aluminum, or alloys thereof), carbon fiber, glass fiber, glass, epoxy fiber composites, wood, and mixtures thereof. In some embodiments, at least one of the substrates is a metal. In other embodiments, both substrates are metal.

The surface of the substrates may be cleaned prior to application of the curable adhesive composition. However, the adhesives compositions are also useful in applications when applied to substrates having hydrocarbon-containing material on the surface. In particular, the curable adhesive compositions may be applied to steel surfaces contaminated with various oils and lubricants such as, for example, mill oil, cutting fluid, and draw oil.

In areas of adhesive bonding, the curable adhesive composition can be applied as liquid, paste, spray, or solid that can be liquefied upon heating. The application can be as a continuous bead or as dots, stripes, diagonals or any other geometrical form that will result in the formation of a useful bond. In some embodiments, the curable adhesive composition is in a liquid or paste form.

The cured adhesive composition can be augmented by welding or mechanical fastening. The welding can occur as spot welds, as continuous seam welds, or as any other welding technology that can cooperate with the adhesive composition to form a mechanically sound joint.

The cured adhesive compositions may be used as structural adhesives. In particular, they may be used as structural adhesives in vehicle assembly, such as the assembly of watercraft vehicles, aircraft vehicles, or motorcraft vehicles such as cars and motor bikes. In particular, the adhesive compositions may be used as hem-flange adhesives or in body frame construction. The adhesive compositions may also be used as structural adhesives in architectural applications or as structural adhesives in various household and industrial appliances.

In another aspect, a method of making a composite article is provided. The method includes applying a two-part curable adhesive composition to a surface, and curing the two-part curable adhesive while in contact with the surface to form a composite article. A first surface is bonded to a second surface through the resulting cured adhesive composition.

In yet another aspect, a method of forming a bonded joint between substrates is provided. The method includes applying a two-part curable adhesive composition to a surface of at least one of two or more substrates, joining the substrates so that the two-part curable adhesive composition is sandwiched between the two or more substrates, and curing the curable adhesive composition to form a bonded joint between the two or more substrates. The composition may be used, for example, to bond metals to metals, metals to carbon fibers, carbon fibers to carbon fibers, metals to glass, or carbon fibers to glass.

EXAMPLES

Objects and advantages of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims.

Solvents and other reagents used were obtained from Aldrich Chemical Company, Milwaukee, Wis. unless otherwise noted.

TABLE 2

| Glossary of materials used | |
|---|---|
| Material | Description |
| ANCAMINE K54 | Trade designation for 2,4,6-tris(dimethylaminomethyl phenol) that is commercially available from Air Products in Allentown, PA. This material was used as a secondary curative. |
| APYRAL 24ES2 | Trade designation of an epoxysilane-functionalized (2% w/w) aluminum trihydrate that is available from Nabaltec GmbH in |

TABLE 2-continued

Glossary of materials used

| Material | Description |
|---|---|
| | Schwandorf, Germany. This filler material was added as a flame retardant and to increase heat resistance of the cured adhesive composition. |
| CAB-O-SIL TS720 | Trade designation of a fumed silica that has been surface modified with polydimethylsiloxane to provide a hydrophilic material. This filler material was obtained from Cabot Corporation in Boston, MA. |
| CARDURA N10 | Trade designation of a glycidyl ester of versatic acid that was obtained from Hexion Specialty Chemicals, Houston, TX. The material has an approximate epoxy equivalent weight of 240-256 grams/equivalent and was used as an oil displacing agent. |
| Calcium nitrate, 4-hydrate | A cure accelerator that was obtained from J. T. Baker, Phillipsburg, NJ. |
| EPON 828 | Trade designation of a diglycidyl ether of bis-phenol A having an approximate epoxy equivalent weight of 187.5 grams/equivalent. This epoxy resin was obtained from Hexion Specialty Chemicals in Houston, TX. |
| EPONEX 1510 | Trade designation of a diglycidyl ether of hydrogenated bis-phenol A having an approximate epoxy equivalent weight of 210 grams/equivalent. This epoxy resin was obtained from Hexion Specialty Chemicals, Houston, TX. |
| Glass beads | A filler obtained from MO-SCI Specialty Products, LLC in Rolla, MO. The particle size was 250 micrometers ± 5%. |
| IPDA | Isophorone diamine (i.e., 1-amino-3-aminomethyl-3,3,5-trimethylcylcohexane) obtained from TCI America in Portland, OR. This material was used as a curing agent, |
| KANE ACE MX 153 | Trade designation of a 33 weight percent concentrate of a core-shell rubber toughening agent in an unmodified liquid epoxy resin based on bisphenol A. The toughening agent was obtained from Kaneka Texas Corporation in Pasadena, TX. |
| K-FLEX XM B301 | Trade designation of a tri-acetoacetate functional ester obtained from King Industries, Norwalk, CT. This material was used in comparative examples rather than the reactive liquid modifier of Formula (I). |
| OEST B804/3 COW-1 | Trade designation of a deep-draw oil obtained from Oest Mineralölwerk GmbH & Co. KG in Freudenstadt, Germany. |
| PARALOID EXL2600 | Trade designation for a core/shell toughening agent with a core-shell architecture (core crosslinked rubber of a polybutadiene-co-polystyrene-copolymer; shell: polymethacrylate). The average particle size was about 250 nanometers. This toughening agent is commercially available from Rohm and Haas in Philadelphia, PA. |
| Polyamidoamine A | An amine-terminated polyamide prepared as described in Example 2 of U.S. Pat. No. 5,629,380 (Baldwin et al.). This material was added as a curing agent. |
| PolyEG 1000 | Refers to a poly(ethylene glycol) diol with a weight average molecular weight of 1000 grams/mole that was obtained from Sigma-Aldrich in Milwaukee, WI. |
| PolyPPG 1000 | Refers to a poly(propylene glycol) diol with a weight average molecular weight of 1000 grams/mole that was obtained from Sigma-Aldrich in Milwaukee, WI. |
| POLYTHF 650 | Trade designation of a diol that is a linear, saturated polyetherol derived from the polymerization of tetrahydrofuran. The material has a weight average molecular weight of 650 grams/mole. This polymeric material was obtained from BASF in Mount Olive, NJ. |
| POLYTHF 1000 | Trade designation of a diol that is a linear, saturated polyetherol derived from the polymerization of tetrahydrofuran. The material has a weight average molecular weight of 1000 grams/mole. This polymeric material was obtained from BASF, Mount Olive, NJ. |
| POLYTHF 2000 | Trade designation of a diol that is a linear, saturated polyetherol derived from the polymerization of tetrahydrofuran. The material has a weight average molecular weight of 2000 grams/mole. This polymeric material was obtained from BASF, Mount Olive, NJ. |
| PARALOID EXL 2600 | Trade designation for a methacrylate/butadiene/styrene polymer with a core-shell architecture (core crosslinked rubber of a polybutadiene-co-polystyrene-copolymer; shell: polymethacrylate) with an average particle size of about 250 nanometers. The polymeric material was obtained from Rohm and Haas in Philadelphia, PA and was added as a toughening agent. |
| SHIELDEX AC5 | Trade designation for an ion-exchanged, synthetic, amorphous silica, available from W. R. Grace, Colombia, MD. This filler material was added to the curable adhesive compositions for corrosion resistance. |
| SILANE Z6040 | Trade designation of a glycidoxypropyltrimethoxysilane, available from Dow Corning, Midland, MI. This material was added as an adhesion promoter. |
| SYLOTHIX 52 | Trade designation for a combination of 400 micrometer long polyethylene fibers and synthetic amorphous silicic acid that was obtained from EP Minerals in Reno, NV. This filler material was added to enhance oil absorption. |

TABLE 2-continued

Glossary of materials used

| Material | Description |
|---|---|
| T-butyl AcAc | Refers to tertiary-butyl acetoacetate, a reactant used to prepare reactive liquid modifier. The material was obtained from TCI America in Portland, OR. |
| Toluene | Solvent obtained from EMD Chemicals in Gibbstown, NJ. |
| TTD | Refers to 4,7,10-trioxa-1,13-tridecane diamine obtained from TCI America, Portland, OR. The material was added as a curing agent. |
| Wollastonite | Refers to calcium silicate, available from Sigma-Aldrich in Milwaukee, WI. This filler material was added to enhance oil absorption. |

Test Methods

Oiling of Metal Panels

Oiled steel panels were prepared by applying a specified volume of OEST B804/3 COW-1 oil to achieve a coating of 3 grams per square meter for the area to be coated (metal used as received), using density data obtained from the appropriate oil MSDS. A clean fingertip of a nitrile glove was used to carefully spread the oil uniformly over the surface. Once the surface was covered, the metal panels were stored at room temperature for 24 hours prior to use.

Generation of Lap Shear Bonds

Lap shear specimens were made using galvanized steel test specimens measuring 4 inches by 1 inch by 0.063 inches (101.6 mm by 25.4 mm by 1.6 mm) that were oiled using the above protocol describing the oiling of metal panels. The lap shear specimen was generated as described in ASTM Specification D 1002-05. A strip of approximately 0.5 inch (12.7 mm) wide and 0.010 inch (0.25 mm) thick of curable adhesive composition was applied to one edge of each of the two oiled lap shear specimens using a scraper. The glass beads, which had a diameter of about 250 micrometers, served as spacers within the adhesive. The two oiled lap shear specimens were bonded together and clamped using a 1 inch binder clip to apply pressure to provide for adhesive spreading. At least five bonds were made for each condition being testing. After the adhesive had been allowed to cure (as described in the examples), the bonds were tested to failure at room temperature on a Sintech Tensile Testing machine (MTS, Eden Prairie, Minn.) using a crosshead displacement rate of 0.1 inch (2.5 mm) per minute. The failure load was recorded. The lap width was measured with a vernier caliper. The quoted lap shear strengths are calculated as failure load/measured bond area. The average and standard deviation were calculated from the results of at least five tests unless otherwise noted.

Generation of T-Peel Bonds

T-peel specimens were made using cold rolled steel test specimens (Type "S" Steel, with dimensions of 12 inches by 1 inches by 0.032 inches (304.8 mm by 25.4 mm by 0.81 mm) and with square corners, 1010 CRS from Q-Lab Corporation in Cleveland, Ohio). These steel test specimens were oiled as described above describing the oiling of metal panels. The T-peel specimen was generated as described in ASTM D-1876. A strip of approximately 1 inch by 9 inch by 10 mil (1 mil is 0.001 inches) (25.4 mm by 228.6 mm by 0.25 mm) of adhesive was applied to each oiled T-peel specimen. The glass beads, which had a diameter of about 250 micrometers, served as spacers within the adhesive. The two oiled lap shear specimens were bonded together and clamped using six 1 inch binder clips to apply pressure to provide for adhesive spreading and to fixture the bond for cure. After the adhesive had been allowed to cure (as described in the examples), the bonds were tested to failure at room temperature on a Sintech Tensile Testing machine using a crosshead displacement rate of 12 inches (304.8 mm) per minute. The initial part of the loading data was ignored. The average load was measured after about 1 inch was peeled. The quoted T-peel strength was the average of at least two peel measurements.

Generation of Symmetric ISO11343:2003E Bonds

ISO11343:2003E symmetric wedge specimens (i.e., article formed by bonding two substrates with an adhesive) were generated using zinc electro-galvanized steel (EZG60G60E) that had a nominal thickness of 0.030 inches and was fabricated according to FIG. 2 in the ISO11343:2003E specification. The galvanized steel was obtained from ACT Test Panels, LLC in Hillsdale, Mich. The symmetric wedge specimen was generated as described in ISO11343:2003E. Two sets of symmetric wedge specimens were placed side-by-side, and a strip of approximately 20 millimeter by 30 millimeter×250 micrometer of adhesive was applied to each symmetric wedge. The glass beads, which had a diameter of about 250 micrometers, served as spacers within the adhesive. After the adhesive was applied to the symmetric wedge specimens, they were clamped together with two 1" binder clips.

The clamped symmetric wedge specimens were cured at 177° C. for 20 minutes in a forced air oven. After the adhesive had been allowed to cure (as described in the examples), the bonds were tested according to the ISO11343:2003E symmetric wedge method on a Dynatup 9250HV impact tester (Instron, Norwood, Mass.) at an initial impact speed of approximately 2 meters per second and an initial impact energy of approximately 90 joules. Bonds tested at room temperature were at ambient laboratory conditions. The average peel force was calculated according to the ISO11343:2003E specification. At least three bonds were tested for each example.

Preparatory Examples 1-5

Preparation of Reactive Liquid Modifiers

Reactive liquid modifiers were made by weighing each of the three ingredients shown in Table 3 into a three-neck round bottom flask. A stirrer was added to the flask, and the flask was purged with nitrogen. The flask was heated to 110° C. in an oil bath under reflux and nitrogen for at least four hours. The resulting product was vacuum distilled for 30 minutes.

TABLE 3

Components used to form reactive liquid modifiers

| Component | Prep Ex 1 | Prep Ex 2 | Prep Ex 3 | Prep Ex 4 | Prep Ex 5 |
|---|---|---|---|---|---|
| POLYTHF 650 | 65 g | | | | |
| POLYTHF 1000 | | 100 g | | | |
| POLYTHF 2000 | | | 100 g | | |
| PolyPEG 1000 | | | | 100 g | |
| PolyPPG 1000 | | | | | 100 g |
| Toluene | 50 g | 50 g | 50 g | 50 g | 50 g |
| t-butyl AcAc | 63.28 g | 63.28 g | 63.28 g | 63.28 g | 63.28 g |

Preparatory Examples 6-7

Second Part (Curing Agent Side) of the Curable Adhesive Compositions

Two second part compositions containing the curing agents were prepared. The components in these two second part compositions are summarized in Table 4. In a one pint metal can, the amines were added (e.g. Polyamidoamine A, TTD, IPDA) and heated to 80° C. Calcium nitrate was added and mixed at 80° C. for one hour. Then, the ANCAMINE K54 was added to the amine mixture and stirred for six hours at 80° C. The remaining ingredients were mixed in at 3000 revolutions per minute (RPM) for five minutes. The final curative mixture was degassed and stored a room temperature.

TABLE 4

Components in second part (curing agent side) of the curable adhesive compositions

| Component | Preparatory Example 6 | Preparatory Example 7 |
|---|---|---|
| Calcium nitrate | 4.9 g | 4.9 g |
| ANCAMINE K54 | 28.5 g | 28.5 g |
| Polyamidoamine A | 65.4 g | 65.4 g |
| TTD | 86.3 g | 67 g |
| IPDA | | 17.5 g |
| CAB-O-SIL TS720 | 16 g | |
| SHIELDEX AC5 | 16 g | |
| APYRAL 24ES2 | 16 g | |
| Wollastonite | | 20 g |
| SYLOTHIX 52 | | 20 g |

Preparatory Examples 8-14

Preparation of First Part (Epoxy Resin Side) of Curable Adhesive Compositions

First part compositions were made according to the amounts specified in Table 5 below. Epoxy resins (e.g. EPON 828, EPONEX 1510), oil displacing agent (CARDURA N10), and core-shell particles (e.g. PARALOID 2600, KANE ACE MX153) were measured out and mixed in a one pint metal can at 120° C. for at least two hours. Then, Silane Z6040 and the reactive liquid modifier were added to the mixture along with the fillers (e.g. SHIELDEX AC5, Wollastonite, APYRAL 24ES2, SYLOTHIX 52). The resulting mixture was stirred at high speed for approximately five minutes until homogeneous. After all ingredients were added, this mixture was degassed and bottled in a closed container stored at room temperature until use.

TABLE 5

Components in first part (epoxy resin side) of curable adhesive compositions

| Component | Prep Ex 8 | Prep Ex 9 | Prep Ex 10 | Prep Ex 11 | Prep Ex 12 | Prep Ex 13 | Prep Ex 14 |
|---|---|---|---|---|---|---|---|
| EPON 828 | 80 g | 80 g | 80 g | 80 g | 80 g | 44.4 g | 80 g |
| EPONEX 1510 | 20 g | 20 g | 20 g | 20 g | 20 g | 10 g | 20 g |
| KANE ACE MX 153 | | | | | | 60.6 g | |
| CARDURA N10 | 7.5 g | 7.5 g | 7.5 g | 7.5 g | 7.5 g | 7.5 g | 7.5 g |
| PARALOID EXL 2600 | 20 g | 20 g | 20 g | 20 g | 20 g | | 20 g |
| Reactive Liquid Modifier- Prep Ex. 1 | 12.1 g | | | | | | |
| Reactive Liquid Modifier- Prep Ex. 2 | | 12.1 g | | | | | |
| Reactive Liquid Modifier- Prep Ex. 3 | | | 12.1 g | | | 13.1 g | |
| Reactive Liquid Modifier- Prep Ex. 4 | | | | 12.1 g | | | |
| Reactive Liquid Modifier- Prep Ex. 5 | | | | | 12.1 g | | |
| K-FLEX XM B-301 | | | | | | | 12.1 g |
| Silane Z6040 | 1 g | 1 g | 1 g | 1 g | 1 g | 3.8 g | 1 g |
| Wollastonite | 8 g | 8 g | 8 g | 8 g | 8 g | 10 g | 8 g |
| SHIELDEX AC 5 | 6 g | 6 g | 6 g | 6 g | 6 g | | 6 g |
| APYRAL 24ES2 | 6 g | 6 g | 6 g | 6 g | 6 g | | 6 g |
| SYLOTHIX 52 | | | | | | 10 g | |

Preparatory/Cure Method C-1

In a small tin cup, 43.8 grams of the first part (epoxy resin side) and 10.0 grams of the second part (curing agent side) were thoroughly mixed together with 1 percent by weight of glass beads (average particle diameter of about 250 micrometers). Bonds were prepared as described above, cured for 24 hours at room temperature, and then further cured for 30 minutes at 180° C.

Preparatory/Cure Method C-2

In a small tin cup, 40.9 grams of the first part (epoxy side) and 10.0 grams of the second part (curing agent side) were thoroughly mixed together with 1 percent by weight of glass beads (average particle diameter of about 250 micrometers). Bonds were prepared as described above and cured for 24 hours at room temperature.

Examples 1-6

Cured Adhesive Compositions and Characterization

Examples 1-6 were cured adhesive compositions prepared as indicated in Table 6 by mixing the denoted epoxy resin side (selected from Preparatory Examples 8-14) and curing agent side (selected from Preparatory Examples 6 or 7) together according to the prep/cure method described above (either method C-1 or method C-2). Adhesive bonds were tested as described above at room temperature. The term "TCF" denotes thin cohesive failure and the term "Coh" denotes cohesive failure.

TABLE 6

Preparation of Cured Adhesive Compositions and Characterization

| Component | Ex 1 | Ex 2 | Ex 3 | Ex 4 | Ex 5 | Ex 6 |
|---|---|---|---|---|---|---|
| Prep Ex (epoxy side) | 8 | 9 | 10 | 11 | 12 | 13 |
| Prep Ex (curing agent side) | 6 | 6 | 6 | 6 | 6 | 7 |
| Prep/Cure Method | C-1 | C-1 | C-1 | C-1 | C-1 | C-2 |
| Overlap Shear (psi) (Numbers in parentheses are in MPa) | 3459 ± 150 (23.8 ± 1.0) | 3526 ± 112 (24.3 ± 0.8) | 3807 ± 86 (26.2 ± 0.6) | 4190 ± 141 (28.9 ± 1.0) | 3869 ± 112 (26.7 ± 0.8) | 3688 ± 648 (25.4 ± 4.5) |
| Failure Mode | TCF | TCF | TCF | TCF | TCF | Coh |
| T-Peel (lb/in) (Numbers in parentheses are in N/25 mm) | 65.1 ± 1.7 (285 ± 7) | 62.8 ± 5.2 (275 ± 23) | 53.6 ± 2.2 (235 ± 10) | 50.0 ± 10.8 (219 ± 47) | 39.3 ± 0.6 (172 ± 3) | 40.7 ± 3.1 (178 ± 14) |
| Failure Mode | TCF | TCF | TCF | TCF | TCF | Coh |
| Average Impact Peel (N/mm) | 37.7 ± 1.5 | 18.4 ± 0.5 | 29.4 ± 0.8 | 31.9 ± 2.4 | 18.5 ± 2.6 | 13.6 ± 1.7 |

Comparative Example 1

Comparative Cured Adhesive Compositions and Characterization

Comparative Example 1 was prepared as indicated in Table 7 by mixing the denoted epoxy resin side (selected from Preparatory Example 12) and curing agent side (selected from Preparatory Example 5) together according to the prep/cure method C-1. Adhesive bonds were tested as described above at room temperature. The term "TCF" denotes thin cohesive failure.

TABLE 7

Comparative Cured Adhesive Compositions and Characterization

| Component | Comparative Example 1 |
|---|---|
| Prep Ex (epoxy side) | 14 |
| Prep Ex (curing agent side) | 6 |
| Prep/Cure Method | C-1 |
| Overlap Shear (psi) (Numbers in parentheses are in MPa) | 4570 ± 130 (31.5 ± 0.9) TCF |
| T-Peel (lb/in) (Numbers in parentheses are in N/25 mm) | 16.1 ± 6.6 (70 ± 29) TCF |
| Average Impact Peel (N/mm) | 12.1 ± 3.6 |

I claim:

1. A curable adhesive composition having a first part and a second part, the curable adhesive composition comprising:
   a) an epoxy resin, wherein the epoxy resin is in the first part of the curable adhesive composition;
   b) a curing agent having at least two groups of formula —NR$^1$H where R$^1$ is selected from hydrogen, alkyl, aryl, or alkylaryl, wherein the curing agent is in the second part of the curable adhesive composition;
   c) a reactive liquid modifier that is in the first part of the curable adhesive composition, the reactive liquid modifier being of Formula (I)

$$R^2(CO)CH_2(CO)O—R^3—O(CO)CH_2(CO)R^2 \quad (I)$$

wherein
R$^2$ is hydrogen or an alkyl; and
R$^3$ is of formula —[(CH$_2$)$_n$O]$_m$—(CH$_2$)$_n$—, wherein R$^3$ has greater than 20 carbon atoms;
n is an integer of 2 to 4; and
m is an integer greater than or equal to 5; and
   d) a toughening agent, wherein the toughening agent is in the first part, in the second part, or in both the first part and the second part of the curable adhesive composition;
   e) an oil displacing agent that is in the first part, in the second part, or in both the first part and the second part of the curable adhesive composition, wherein the oil displacing agent is soluble in the curable adhesive composition, has a surface tension in a range of 15 to 32 dynes/cm, and is not selected from a glycidyl ether; and f) fibrillated organic fibers comprising polyolefin fibers or aramid fibers.

2. The curable adhesive composition of claim 1, wherein the oil displacing agent has a solubility parameter in the range of 6 to 12 $cal^{0.5}/cm^{1.5}$.

3. The curable adhesive composition of claim 1, wherein the oil displacing agent is selected from a glycidyl ester, cyclic terpene, cyclic terpene oxide, mono-ester, di-ester, tri-ester, trialkyl phosphate, epoxy alkane, alkyl methacrylate, vinyl alkyl esters, or combination thereof.

4. The curable adhesive composition of claim 1, wherein the variable n is equal to 4.

5. The curable adhesive composition of claim 1, wherein $R^3$ has at least 30 carbon atoms.

6. The curable adhesive composition of claim 1, wherein the epoxy resin has comprises a glycidyl ether having two to four glycidyl groups.

* * * * *

UNITED STATES PATENT AND TRADEMARK OFFICE
CERTIFICATE OF CORRECTION

| | |
|---|---|
| PATENT NO. | : 9,528,035 B2 |
| APPLICATION NO. | : 13/389947 |
| DATED | : December 27, 2016 |
| INVENTOR(S) | : Christopher Campbell |

It is certified that error appears in the above-identified patent and that said Letters Patent is hereby corrected as shown below:

In the Specification

Column 6
Line 5, delete "polypropylene oxide)" and insert -- poly(propylene oxide) --, therefor.

Line 16, delete "cylcohexyl," and insert -- cyclohexyl, --, therefor.

Column 8
Lines 15-16, delete "isophorene" and insert -- isophorone --, therefor.

Line 20, delete "-trioxamidecane-" and insert -- -trioxatridecane- --, therefor.

Lines 23-24, delete "polypropylene oxide)" and insert -- poly(propylene oxide) --, therefor.

Column 9
Line 9, delete "oxarine" and insert -- oxirane --, therefor.

Line 11, delete "imidizoles" and insert -- imidazoles --, therefor.

Line 14, after "of" insert -- Formula (IV). --.

Line 59, delete "-$[(CH_2)_n\text{-}O]_m\text{-}(CH_2)_n\text{-}$." and insert -- -$[(CH_2)_nO]_m\text{-}(CH_2)_n\text{-}$. --, therefor.

Column 10
Line 25, delete "polypropylene oxide)" and insert -- poly(propylene oxide) --, therefor.

Column 11
Line 61, delete "butadiene-nitrile" and insert -- butadienenitrile --, therefor.

Signed and Sealed this
Twenty-first Day of March, 2017

Michelle K. Lee
*Director of the United States Patent and Trademark Office*

Column 15
Line 65 (approx.), delete "dialkly" and insert -- dialkyl --, therefor.

Column 16
Line 65, delete "methacarylates" and insert -- methacrylates --, therefor.

Columns 23-24
Line 26 (TABLE 2-continued), delete "trimethylcylcohexane)" and insert -- trimethylcyclohexane) --, therefor.